(12) United States Patent  
Yoon et al.

(10) Patent No.: US 9,385,404 B2  
(45) Date of Patent: *Jul. 5, 2016

(54) BATTERY MODULE OF EXCELLENT HEAT DISSIPATION PROPERTY AND HEAT EXCHANGE MEMBER

(71) Applicant: LG CHEM, LTD., Seoul (KR)

(72) Inventors: Hee Soo Yoon, Daejeon (KR); Shinichi Jinushi, Daejeon (KR); Jin Kyu Lee, Busan (KR); Dal Moh Kang, Daejeon (KR); Jongmoon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 235 days.

This patent is subject to a terminal disclaimer.

(21) Appl. No.: 14/038,316

(22) Filed: Sep. 26, 2013

(65) Prior Publication Data

US 2014/0030561 A1 Jan. 30, 2014

Related U.S. Application Data

(63) Continuation of application No. 12/742,011, filed as application No. PCT/KR2008/006253 on Oct. 22, 2008, now Pat. No. 8,609,271.

(30) Foreign Application Priority Data

Nov. 9, 2007 (KR) ........................ 10-2007-0114034

(51) Int. Cl.
*H01M 10/50* (2006.01)
*H01M 10/613* (2014.01)
(Continued)

(52) U.S. Cl.
CPC ........... *H01M 10/5004* (2013.01); *B60L 1/003* (2013.01); *B60L 3/0046* (2013.01); *B60L 11/1864* (2013.01); *B60L 11/1874* (2013.01); *B60L 11/1879* (2013.01); *H01M 2/024* (2013.01); *H01M 2/0212* (2013.01); *H01M 2/0262* (2013.01); *H01M 2/0275* (2013.01); *H01M 2/0277* (2013.01); *H01M 2/0285* (2013.01); *H01M 2/0287* (2013.01);
(Continued)

(58) Field of Classification Search
CPC .......... H01M 10/647; H01M 10/6554; H01M 10/6551; H01M 10/6555
See application file for complete search history.

(56) References Cited

U.S. PATENT DOCUMENTS 6,004,693 A 12/1999 Fukuda et al.
6,087,036 A 7/2000 Rouillard et al.
(Continued)

FOREIGN PATENT DOCUMENTS

CN 1189925 A 8/1998
CN 1838463 A 9/2006
(Continued)

*Primary Examiner* — Rena L Dye
(74) *Attorney, Agent, or Firm* — Birch, Stewart, Kolasch & Birch, LLP

(57) ABSTRACT

Disclosed herein is a battery module including two or more plate-shaped battery cells sequentially stacked, wherein each of the plate-shaped battery cells is constructed in a structure in which an electrode assembly of a cathode/separator/anode structure is mounted in a battery case formed of a laminate sheet including a resin layer and a metal layer, and a heat exchange member, including a plurality of heat exchange plates and a frame to which the heat exchange plates are connected, is mounted at one side of a stack of the battery cells for removing heat generated from the battery cells during the charge and discharge of the battery cells.

10 Claims, 5 Drawing Sheets

(51) Int. Cl.
- *H01M 2/02* (2006.01)
- *H01M 2/10* (2006.01)
- *H01M 10/42* (2006.01)
- *B60L 1/00* (2006.01)
- *B60L 3/00* (2006.01)
- *B60L 11/18* (2006.01)
- *H01M 10/625* (2014.01)
- *H01M 10/647* (2014.01)
- *H01M 10/6556* (2014.01)
- *H01M 10/6551* (2014.01)
- *H01M 10/6567* (2014.01)
- *H01M 10/6555* (2014.01)
- *H01M 10/6554* (2014.01)
- *H01M 10/651* (2014.01)
- *H01M 6/42* (2006.01)
- *H01M 10/052* (2010.01)
- *H01M 10/30* (2006.01)
- *H01M 10/34* (2006.01)

(52) U.S. Cl.
CPC ........ *H01M2/1077* (2013.01); *H01M 10/4207* (2013.01); *H01M 10/613* (2015.04); *H01M 10/625* (2015.04); *H01M 10/647* (2015.04); *H01M 10/651* (2015.04); *H01M 10/6551* (2015.04); *H01M 10/6554* (2015.04); *H01M 10/6555* (2015.04); *H01M 10/6556* (2015.04); *H01M 10/6567* (2015.04); *B60L 2240/545* (2013.01); *H01M 6/42* (2013.01); *H01M 10/052* (2013.01); *H01M 10/30* (2013.01); *H01M 10/345* (2013.01); *Y02T 10/7005* (2013.01); *Y02T 10/7011* (2013.01); *Y02T 10/7061* (2013.01)

(56) References Cited

U.S. PATENT DOCUMENTS

| | | | |
|---|---|---|---|
| 7,968,223 | B2 | 6/2011 | Lee et al. |
| 8,609,271 | B2 * | 12/2013 | Yoon et al. ............ 429/120 |
| 2004/0142190 | A1 * | 7/2004 | Kawai et al. ............ 428/461 |
| 2005/0026014 | A1 * | 2/2005 | Fogaing et al. ............ 429/26 |
| 2005/0110460 | A1 | 5/2005 | Arai et al. |
| 2005/0168918 | A1 * | 8/2005 | Araki et al. ............ 361/517 |
| 2006/0214641 | A1 | 9/2006 | Cho |
| 2006/0216583 | A1 | 9/2006 | Lee et al. |
| 2007/0207377 | A1 | 9/2007 | Han et al. |
| 2008/0299452 | A1 | 12/2008 | Nakazawa |
| 2011/0104545 | A1 | 5/2011 | Meintschel et al. |

FOREIGN PATENT DOCUMENTS

| | | |
|---|---|---|
| CN | 1848518 A | 10/2006 |
| EP | 1 630 896 A1 | 3/2006 |
| EP | 2176921 A1 | 4/2010 |
| JP | 08-148187 A | 6/1996 |
| JP | 2001-297741 A | 10/2001 |
| JP | 2003-272974 A | 9/2003 |
| JP | 2004-31281 A | 1/2004 |
| JP | 2005-26219 A | 1/2005 |
| JP | 2005-56655 A | 3/2005 |
| JP | 2006-245414 A | 9/2006 |
| JP | 2006-278330 A | 10/2006 |
| JP | 2007-66647 A | 3/2007 |
| KR | 10-0648698 B1 | 11/2006 |
| KR | 10-0667943 B1 | 1/2007 |
| WO | WO 2009/018941 A1 | 2/2009 |

\* cited by examiner

502

502

BATTERY MODULE OF EXCELLENT HEAT DISSIPATION PROPERTY AND HEAT EXCHANGE MEMBER

CROSS REFERENCE TO RELATED APPLICATIONS

This application is a Continuation of U.S. application Ser. No. 12/742,011, filed Sep. 13, 2010, which is the National Phase of PCT International Application No. PCT/KR2008/006253, filed on Oct. 22, 2008, which claims priority under 35 U.S.C. 119(a) to Patent Application No. 10-2007-0114034, filed in the Republic of Korea on Nov. 9, 2007. The entire contents of all of the above applications are hereby incorporated by reference.

TECHNICAL FIELD

The present invention relates to a battery module of excellent heat dissipation property and a heat exchange member, and, more particularly, to a battery module including two or more plate-shaped battery cells sequentially stacked, wherein each of the plate-shaped battery cells is constructed in a structure in which an electrode assembly of a cathode/separator/anode structure is mounted in a battery case formed of a laminate sheet including a resin layer and a metal layer, and a heat exchange member, including a plurality of heat exchange plates and a frame to which the heat exchange plates are connected, is mounted at one side of a stack of the battery cells for removing heat generated from the battery cells during the charge and discharge of the battery cells.

BACKGROUND ART

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary batteries are being increased owing to advantages of the secondary batteries, and hereafter the secondary batteries are expected to be applied to more applications and products than now.

As kinds of applications and products, to which the secondary batteries are applicable, are increased, kinds of batteries are also increased such that the batteries can provide powers and capacities corresponding to the various applications and products.

Furthermore, there is a strong need to reduce the sizes and weights of the batteries applied to the corresponding applications and products.

For example, small-sized mobile devices, such as mobile phones, personal digital assistants (PDA), digital cameras, and laptop computers, use one or several small-sized, light-weighted battery cells for each device according to the reduction in size and weight of the corresponding products. On the other hand, middle- or large-sized devices, such as electric vehicles and hybrid electric vehicles, use a middle- or large-sized battery module (which may be referred to as a "battery pack") having a plurality of battery cells electrically connected with each other because high power and large capacity is necessary for the middle- or large-sized devices. The size and weight of the battery module is directly related to the receiving space and power of the corresponding middle- or large-sized device. For this reason, manufacturers are trying to manufacture small-sized, light-weighted battery modules.

Meanwhile, as battery cells are connected to one another, while the battery cells are stacked, to increase the capacities of battery modules, the dissipation of heat from the battery cells becomes serious. Heat is generated from lithium secondary batteries during the charge and discharge of the lithium secondary batteries. If the heat is not effectively removed, the heat accumulates in the respective lithium secondary batteries, with the result that the deterioration of the secondary batteries is caused, and the safety of the secondary batteries is greatly lowered. In particular, for a battery requiring high-speed charging and discharging characteristics as in a power source for electric vehicles and hybrid electric vehicles, a large amount of heat is generated from the battery at the time when the battery instantaneously provides high power.

Also, a laminate type battery case of a pouch-shaped battery cell widely used in the battery module is coated with a polymer material exhibiting low heat conductivity, with the result that it is difficult to effectively lower the overall temperature of the battery.

In connection with this matter, for example, Japanese Patent Application Publication No. 2001-297741 discloses a battery pack constructed in a structure in which metal heat collection plates exhibiting high heat conductivity are interposed between respective batteries, and heat pipes attached to the respective heat collection plates are connected to a heat dissipation member mounted at the outside of a battery pack case, thereby discharging heat out of the battery pack. However, the disclosed battery pack has problems in that the sectional area of a connection region between the heat pipes and the heat dissipation member is small, and therefore, it is not possible to effectively transmit heat in the battery pack case to the heat dissipation member.

Therefore, there is a high necessity for a technology that is capable of fundamentally solving the above-mentioned problems.

DISCLOSURE OF INVENTION

Technical Problem

Therefore, the present invention has been made to solve the above problems, and other technical problems that have yet to be resolved.

As a result of a variety of extensive and intensive studies and experiments on a cutting frame, the inventors of the present invention have found that, when a heat exchange member including a plurality of interconnected heat exchange plates is located at one side of a stack of battery cells constituting a battery module, it is possible to effectively control the temperature of the battery cells while not increasing the thickness of the battery module or minimizing the increase of the thickness of the battery module. The present invention has been completed based on these findings.

Technical Solution

In accordance with one aspect of the present invention, the above and other objects can be accomplished by the provision of a battery module including two or more plate-shaped battery cells sequentially stacked, wherein each of the plate-shaped battery cells is constructed in a structure in which an electrode assembly of a cathode/separator/anode structure is mounted in a battery case formed of a laminate sheet including a resin layer and a metal layer, and a heat exchange member, including a plurality of heat exchange plates and a frame to which the heat exchange plates are connected, is mounted at one side of a stack of the battery cells for removing heat generated from the battery cells during the charge and discharge of the battery cells.

Generally, a conventional battery module is constructed in a structure in which a plurality of battery cells are stacked, such that the battery cells are spaced at predetermined spacing intervals, to form heat exchange medium channels. Air flows through the heat exchange medium channels to prevent the overheating of the battery cells ('an air cooling type structure'); however, it is not possible to achieve a sufficient heat dissipation effect. On the other hand, the battery module according to the present invention is constructed in a structure in which the heat exchange member, including the plurality of heat exchange plates and the frame, is mounted at one side of the battery cell stack, with the result that it is possible to cool the battery cell stack with higher efficiency than the above-described air cooling type structure without the need of spaces defined between the respective battery cells or even with very small spaces defined between the respective battery cells, thereby maximizing the heat dissipation efficiency of the battery module.

That is, the battery module according to the present invention is constructed in a structure in which the heat exchange member is mounted at one side of the battery cell stack, with the result that heat generated from the battery cells due to ion occlusion/deocclusion reaction between a cathode active material and an anode active material during the charge and discharge of the battery cells is absorbed by the heat exchange member, and then the absorbed heat is effectively discharged out of the battery module by the heat exchange member.

According to the present invention, each battery cell constituting the battery module is not particularly restricted so long as the battery cell is a secondary battery that can be charged and discharged. For example, a lithium secondary battery, a nickel-metal hydride (Ni-MH) secondary battery, or a nickel-cadmium (Ni—Cd) secondary battery may be used as the battery cell. Preferably, the lithium secondary battery is used as the battery cell, since the lithium secondary battery provides a high power to weight ratio.

Based on its shape, the lithium secondary battery may be classified as a cylindrical battery, a prismatic battery, or a pouch-shaped battery. The battery cell according to the present invention is applied to a battery having a sealing part thermally welded at an outer circumference end region thereof. In a preferred embodiment, the battery cell according to the present invention is a light-weighted pouch-shaped battery constructed in a structure in which an electrode assembly is mounted in a battery case formed of a laminate sheet including an inner resin layer, which is thermally weldable, an isolation metal layer, and an outer resin layer exhibiting excellent durability.

In a preferred embodiment, the heat exchange plates are at least partially interposed respectively between the stacked battery cells. That is, the heat exchange plates are at least partially interposed respectively between the stacked battery cells while the heat exchange plates are in tight contact with the corresponding battery cells. Consequently, heat generated from the battery cells is absorbed by the heat exchange plates, and then the absorbed heat is effectively discharged out of the battery module by the heat exchange member.

When the size of each of the heat exchange plates is too large, the weight or volume of the battery module increases. On the other hand, when the size of each of the heat exchange plates is too small, the heat dissipation effect decreases. Preferably, therefore, each of the heat exchange plates has a size to effectively absorb and discharge heat generated from the corresponding battery cell. For example, in a structure in which the heat exchange plates are at least partially interposed respectively between the stacked battery cells, each of the heat exchange plates has a width equivalent to 50 to 100% of a width of each of the battery cells, whereby it is possible to achieve desired cooling while not increasing the size of the battery module.

Preferably, the frame is provided with one or more heat exchange medium channels through which a heat exchange medium flows. For example, the frame may be provided with heat exchange medium channels through which a liquid heat exchange medium, such as water, flows, thereby it is possible to achieve an excellent cooling effect with higher reliability than the previously-described air-cooling type structure.

According to circumstances, at least some of a sealing part formed at the battery case of each of the battery cells where no electrode terminals are formed may extend such that the at least some of the sealing part is longer than the remaining sealing part, and the heat exchange member may be located on the extending sealing part.

When the battery cells are stacked in a structure in which the battery cells are in tight contact with each other, or in a structure in which the battery cells are adjacent to each other, to construct a battery module, it is difficult to dissipate heat generated from main bodies of the battery cells to the outside due to the structure in which the battery cells are close to each other. Even in the stacked structure, however, the sealing parts of the respective battery cells are not close to each other. In the structure having the extending sealing parts or in the structure in which the heat exchange member is coupled to the sealing parts, as described above, therefore, it is possible to effectively dissipate the heat generated from the main bodies of the battery cells to the outside through the sealing parts of the respective battery cells and the heat exchange member.

In order to achieve the above-described structure, it is preferred that the frame of the heat exchange member be further provided with slits through which the extending sealing parts of the respective battery cells are inserted. In this structure, the heat exchange plates of the heat exchange member may be interposed between the respective battery cells or located in a direction opposite to the battery cell stack as needed.

That is, in a preferred embodiment, the extending sealing parts of the respective battery cells are inserted through the corresponding slits of the heat exchange member, and the heat exchange plates of the heat exchange member are interposed between the respective battery cells, thereby easily absorbing heat generated from the stacked battery cells.

In another preferred embodiment, the extending sealing parts of the respective battery cells are inserted through the corresponding slits of the heat exchange member, and the heat exchange plates of the heat exchange member are located in a direction opposite to the battery cell stack.

In the above-described structure, the heat exchange plates may be in contact with the respective extending sealing parts to further accelerate the heat dissipation of the battery cells. That is, since the heat exchange plates are in contact with the respective extending sealing parts, heat transmitted to the extending sealing parts from the main bodies of the battery cells is conducted to the heat exchange plates, and the heat conducted to the heat exchange plates is easily discharged out of the battery module.

The heat exchange member is not particularly restricted so long as the heat exchange member is made of a material exhibiting excellent heat conductivity. Preferably, the heat exchange member is made of a metal or carbon material exhibiting higher heat conductivity and mechanical strength than other materials.

In accordance with another aspect of the present invention, there is provided a heat exchange member for heat dissipation of a battery module including a plurality of plate-shaped battery cells, including (a) two or more heat exchange plates and (b) a frame to which one side of each of the heat exchange plates is connected, the frame having slits through which sealing parts of the respective battery cells are inserted, the slits being located between the respective heat exchange plate connection regions, the frame having one or more heat exchange medium channels through which a heat exchange medium flows.

The heat exchange member is a novel member which has not been known in the art to which the present invention pertains. As previously described, the heat exchange member may be mounted to the module in various manners, thereby providing high cooling efficiency while not increasing the thickness of the battery module or minimizing the increase of the thickness of the battery module.

Meanwhile, a middle- or large-sized battery pack is constructed in a structure in which a plurality of battery modules are stacked to provide high power and large capacity. The battery modules constituting the battery pack are required to exhibit higher heat dissipation efficiency, which is necessary to secure the safety of the respective battery modules.

In accordance with a yet another aspect of the present invention, therefore, there is provided a middle- or large-sized battery pack manufactured by combining the battery modules according to a desired power and capacity. The middle- or large-sized battery pack may be used as a power source for devices which require high-power and large-capacity electricity and can be reliably used for a long period of time and to which external forces, such as vibration and impact, are applied. Preferably, the middle- or large-sized battery pack is used as a power source for electric vehicles or hybrid electric vehicles.

The structure of the middle- or large-sized battery pack and a method of manufacturing the middle- or large-sized battery pack are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
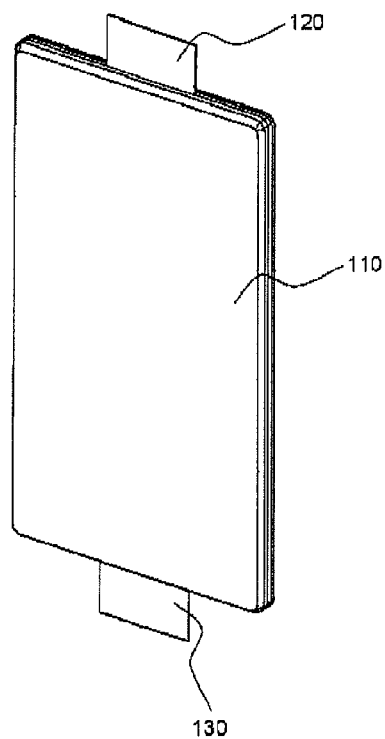
FIG. 1 is a typical view illustrating a plate-shaped battery cell.

FIG. 1 is a typical view illustrating a plate-shaped battery cell.

Referring to FIG. 1, the plate-shaped battery cell 100 includes an electrode assembly (not shown) of a cathode/separator/anode structure, mounted in a battery case 110 formed of a laminate sheet including a resin layer and a metal layer, and a cathode terminal 120 and an anode terminal 130 electrically connected to the upper end and the lower end of the battery case 110, respectively, while the cathode terminal 120 and the anode terminal 130 extrude out of the battery case 110.

Figure 2:
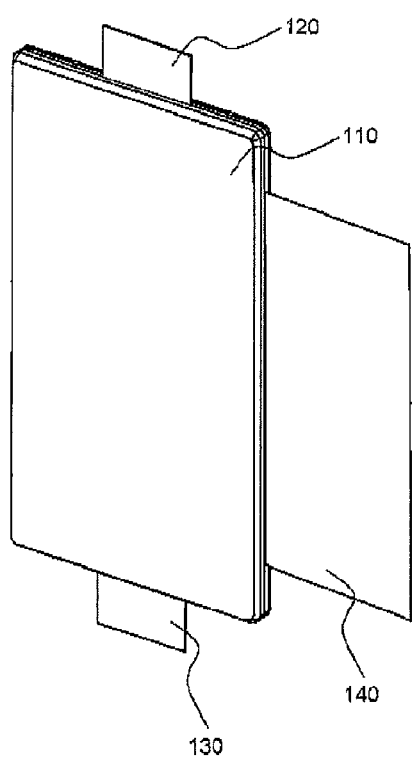
FIG. 2 is a typical view illustrating a plate-shaped battery cell of which one side sealing part extends.

FIG. 2 is a typical view illustrating a plate-shaped battery cell of which one side sealing part extends.

Referring to FIG. 2, one side sealing part 140 of the plate-shaped battery cell 200 where electrode terminals 120 and 130 are not formed, among sealing parts of the plate-shaped battery cell 200, extends outward from a battery case 110 such that the one side sealing part 140 is longer than the other side sealing part (not shown for simplicity of the drawing). The extending sealing part 140 is inserted and fixed in a slit 422 of a frame 420 as shown in FIG. 3.

Figure 3:
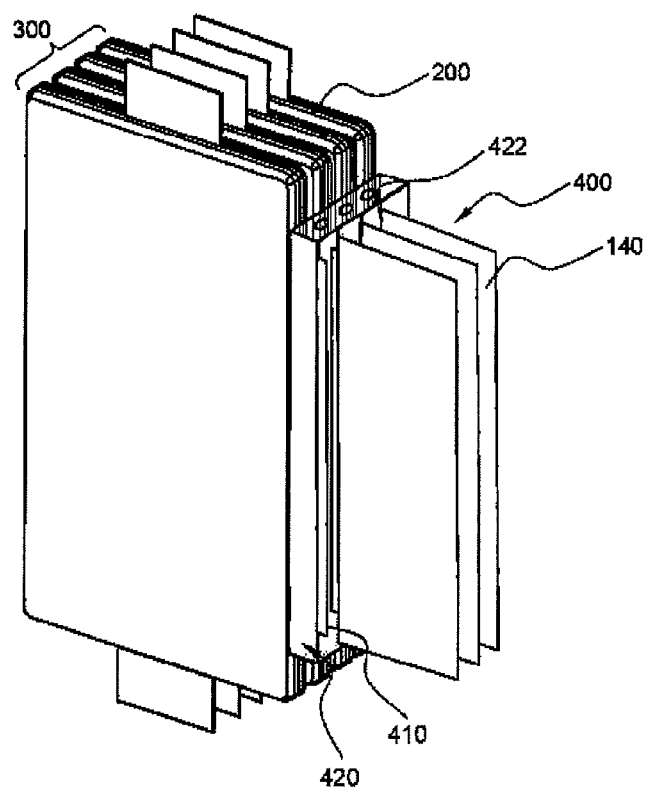
FIG. 3 is a typical view illustrating a structure in which a heat exchange member mounted at one side of a battery module according to a preferred embodiment of the present invention.
Figure 4:
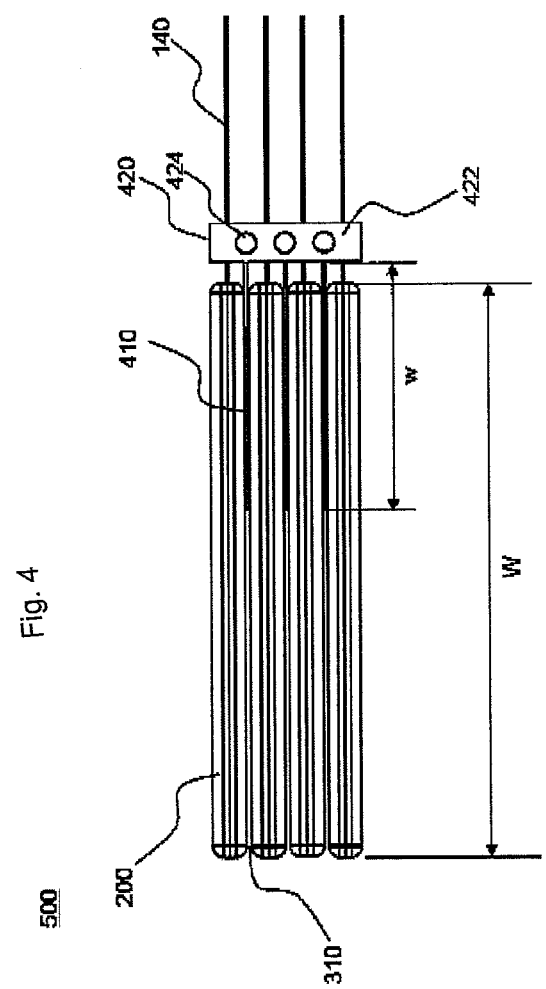
FIG. 4 is a typical plan view of FIG. 3.

FIG. 3 is a typical view illustrating a structure in which a heat exchange member mounted at one side of a battery module according to a preferred embodiment of the present invention, and FIG. 4 is a typical plan view of FIG. 3.

Referring to these drawings, the battery module 500 is constructed in a structure in which the heat exchange member 400 is mounted at one side of a battery cell stack 300 including a plurality of battery cells 200 sequentially stacked.

The heat exchange member 400 includes a plurality of heat exchange plates 410 and a frame 420 to which one side of each heat exchange plate 410 is connected. The extending sealing parts 140 of the respective battery cells 200 extrude outward through slits 422 formed in the frame 420.

The heat exchange plates 410 are interposed between the respective battery cells 200 while each heat exchange plate 410 has a width w less than the width W of each battery cell 200. However, the heat exchange plates 410 are in tight contact with main bodies of the respective battery cells 200, and therefore, heat generated from the main bodies of the respective battery cells 200 is conducted to the heat exchange plates 410, thereby achieving a high heat dissipation effect. Spaces 310 defined between the respective battery cells 200 excluding regions where the heat exchange plates 410 are located may be used as air flow channels, although the spaces 310 are very small.

Also, the frame 420 is provided with heat exchange medium channels 424 through which a liquid heat exchange medium, such as water, flows. The heat exchange medium channels 424 are disposed between the respective slits 422 of the frame 420, whereby it is possible to remove heat transmitted from the heat exchange plates 410 with high reliability and excellent cooling efficiency.

Figure 5:
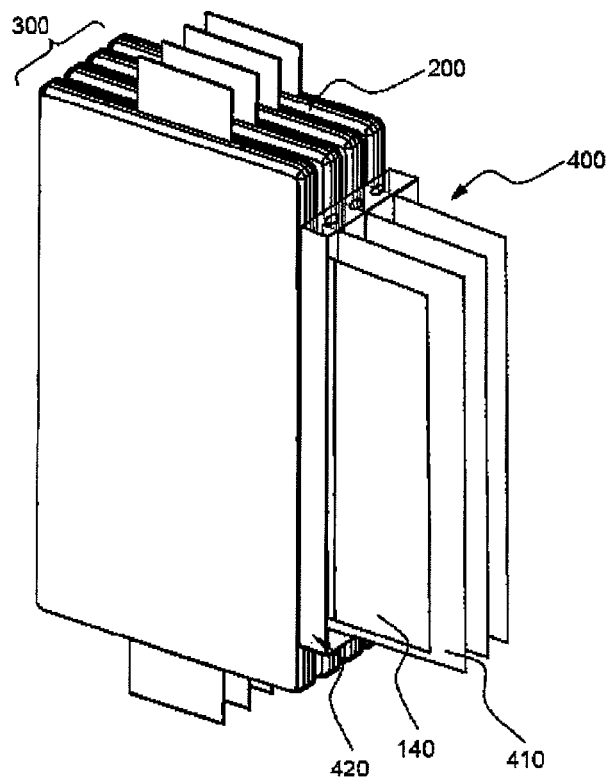
FIG. 5 is a typical view illustrating a structure in which a heat exchange member mounted at one side of a battery module according to another preferred embodiment of the present invention.
Figure 6:
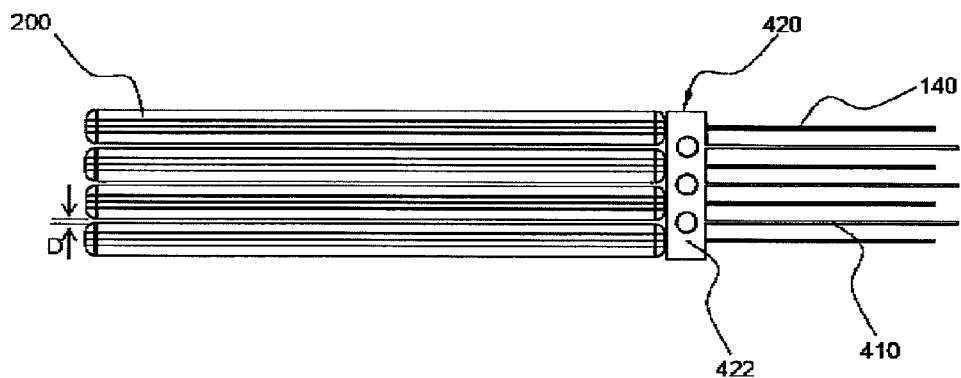
FIG. 6 is a typical plan view of FIG. 5.

FIG. 5 is a typical view illustrating a structure in which a heat exchange member mounted at one side of a battery module according to another preferred embodiment of the present invention, and FIG. 6 is a typical plan view of FIG. 5.

Referring to these drawings, the extending sealing parts 140 of the respective battery cells 200 extrude outward through the corresponding slits 422 of the frame 420, and the heat exchange plates 410 of the heat exchange member 400 are located in the direction opposite to the battery cell stack 300 from the frame 420 (i.e., in the outward direction). In this structure, the battery cells 200 constituting the battery module 502 are stacked while the battery cells 200 are spaced at predetermined spacing intervals D such that air can flow between the respective battery cells 200.

Figure 7:
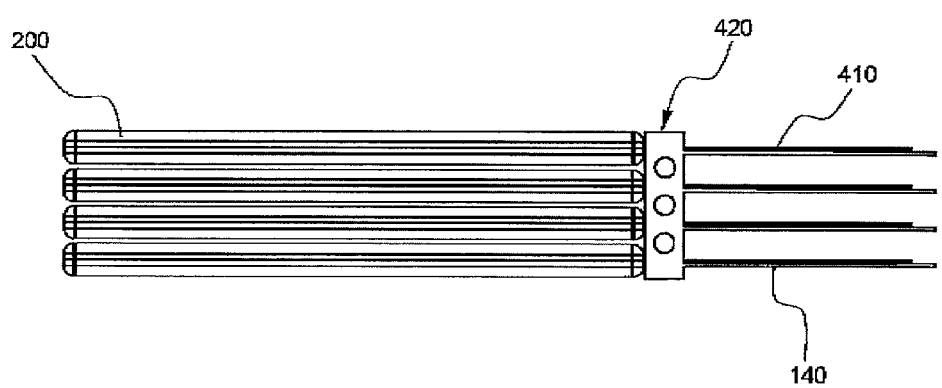
FIG. 7 is a typical plan view illustrating a modification of FIG. 6.

In FIG. 7, which is a typical plan view illustrating a modification of FIG. 6, there is illustrated a battery module 503 constructed in a structure in which the heat exchange plates 410 of the heat exchange member 400 are in contact with the respective extending sealing parts 140 of the battery cells 200.

Since the extending sealing parts 140 are in contact with the corresponding heat exchange plates 410, heat transmitted to the extending sealing parts 140 from the main bodies of the battery cells 200 is directly conducted to the heat exchange plates 410, and therefore, it is possible to more easily discharge the heat to the outside with high heat conductivity.

Figure 8:
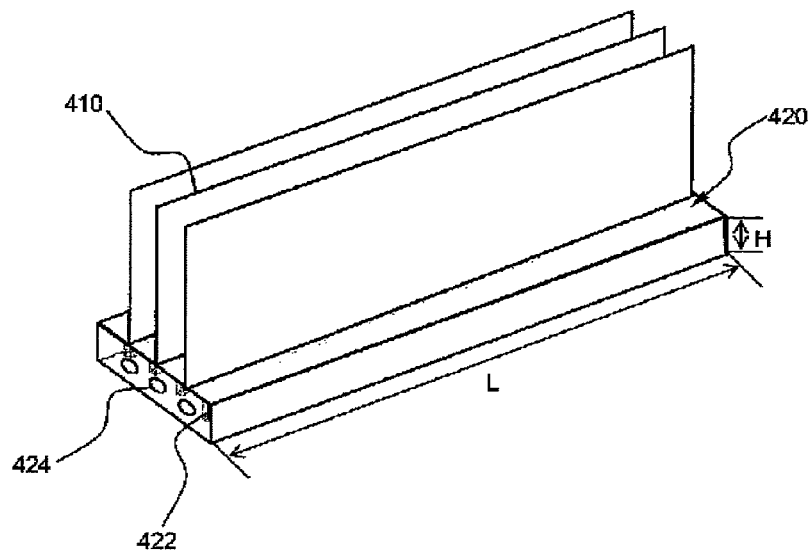
FIG. 8 is a typical enlarged view of the heat exchange member of FIG. 5.

FIG. 8 is a typical enlarged view of the heat exchange member of FIG. 5.

Referring to FIG. 8, the heat exchange member 400 includes the plurality of heat exchange plates 410 and the frame 420 to which one side of each heat exchange plate 410 is connected. Also, the slits 422, through which the extending sealing parts 140 of FIG. 5 are inserted, of the frame 420 are formed in the shape of a rectangular parallelepiped such that the slits 422 have the same height H as the frame 420. The heat exchange medium channels 424, through which water flows, are formed between the respective slits 422 in the longitudinal direction L of the frame 420.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is constructed in a structure in which the heat exchange member to accelerate the dissipation of heat from the battery cells is mounted at one side of the battery cell stack, and the extending sealing parts of the battery cells are connected to the heat exchange member. Consequently, it is possible to effectively discharge heat generated from the battery cells to the outside.

Furthermore, the heat exchange medium channels are formed in the frame such that the heat is further removed by a water cooling method, thereby further accelerate the heat dissipation of the battery cells. Owing to the improved heat dissipation efficiency, it is possible to uniformly control the internal temperature of the battery cells, thereby greatly improving the life span and safety of the battery cells.

The invention claimed is:

1. A battery module including two or more plate-shaped battery cells sequentially stacked, wherein each of the plate-shaped battery cells is constructed in a structure in which an electrode assembly of a cathode/separator/anode structure is mounted in a battery case formed of a laminate sheet including a resin layer and a metal layer, and a heat exchange member, including a plurality of heat exchange plates and a frame to which the heat exchange plates are connected, is mounted at one side of a stack of the battery cells for removing heat generated from the battery cells during the charge and discharge of the battery cells, wherein at least some of a sealing part formed at the battery case of each of the battery cells where no electrode terminals are formed extends such that the at least some of the sealing part is longer than the remaining sealing part, and the heat exchange member is located on the extending sealing part, wherein the heat exchange plates are in face-to-face contact for thermal conduction with the respective extending sealing parts, and wherein the frame of the heat exchange member is provided with slits through which the extending sealing parts of the respective battery cells are inserted.

2. The battery module according to claim 1, wherein the laminate sheet includes an inner resin layer, which is thermally weldable, an isolation metal layer, and an outer resin layer.

3. The battery module according to claim 1, wherein the heat exchange plates are at least partially interposed respectively between the stacked battery cells.

4. The battery module according to claim 1, wherein each of the heat exchange plates has a width equivalent to 50 to 100% of a width of each of the battery cells.

5. The battery module according to claim 1, wherein the frame is provided with one or more heat exchange medium channels through which a heat exchange medium flows.

6. The battery module according to claim 1, wherein the extending sealing parts of the respective battery cells are inserted through the corresponding slits of the heat exchange member, and the heat exchange plates of the heat exchange member are interposed between the respective battery cells.

7. The battery module according to claim 1, wherein the extending sealing parts of the respective battery cells are inserted through the corresponding slits of the heat exchange member, and the heat exchange plates of the heat exchange member are located in an outward direction to the battery cell stack.

8. The battery module according to claim 1, wherein the heat exchange member is made of a metal material or a carbon material.

9. A battery pack manufactured by combining battery modules according to claim 1 based on a desired power and capacity, wherein the battery pack is used as a power source for electric vehicles or hybrid electric vehicles.

10. A heat exchange member for heat dissipation of a battery module including a plurality of plate-shaped battery cells, comprising:
(a) two or more heat exchange plates for face-to-face contact for thermal conduction; and
(b) a frame to which one side of each of the heat exchange plates is connected, the frame having slits through which sealing parts of the respective battery cells are inserted, the slits being located between the respective heat exchange plate connection regions, the frame having one or more heat exchange medium channels through which a heat exchange medium flows.

* * * * *